United States Patent [19]

Tanaka

[11] Patent Number: 5,119,294
[45] Date of Patent: Jun. 2, 1992

[54] POS TERMINAL GROUP MANAGEMENT DEVICE WITH MEMORY FOR PRE-STORING DIFFERENT COLLECTION DATA RANGES FOR EACH POS TERMINAL

[75] Inventor: Toshifumi Tanaka, Kyoto, Japan

[73] Assignee: Omron Tateisi Electronics Company, Kyoto, Japan

[21] Appl. No.: 565,217

[22] Filed: Aug. 9, 1990

[30] Foreign Application Priority Data

Nov. 12, 1986 [JP] Japan .................. 61-268889

[51] Int. Cl.⁵ .................. G07G 1/14; G06F 15/21
[52] U.S. Cl. .................................................. 364/405
[58] Field of Search ............... 364/404, 405, 200, 900

[56] References Cited

U.S. PATENT DOCUMENTS

| 3,596,256 | 7/1971 | Felcheck et al. |
| 4,186,439 | 1/1980 | Shimura et al. ............. 364/405 |
| 4,319,326 | 3/1982 | Uchida .......................... 364/405 |
| 4,425,619 | 1/1984 | Matsuda et al. |
| 4,508,962 | 4/1985 | Yamasaki ................. 364/405 X |
| 4,564,904 | 1/1986 | Kumagai ....................... 364/405 |
| 4,594,664 | 6/1986 | Hashimoto .................... 364/405 |

FOREIGN PATENT DOCUMENTS

| 0116168 | 9/1981 | Japan ........................... 364/403 |
| 0118167 | 9/1981 | Japan ........................... 364/405 |
| 56-166580 | 12/1981 | Japan . |
| 0008374 | 1/1983 | Japan ........................... 364/405 |
| 0027258 | 2/1983 | Japan ........................... 364/405 |
| 0003274 | 1/1986 | Japan ........................... 364/405 |
| 1177020 | 1/1970 | United Kingdom . |

Primary Examiner—Clark A. Jablon
Attorney, Agent, or Firm—Dickstein, Shapiro & Morin

[57] ABSTRACT

In a transaction processing system including a plurality of POS terminal devices (cash registers), a POS terminal group management device (cluster controller) and a sales management device (store controller), only necessary totalized data are transmitted from the POS terminal devices to the sales management device through the POS terminal group management device in accordance with totalization pattern information respectively associated with each individual POS terminal device, which information is pre-stored in the group management device, thus increasing efficiency and speed of sales information processing.

10 Claims, 7 Drawing Sheets

TOTALIZE-PATTERN SETTING MESSAGE

| 3 | ECR1 TOTALIZE PATTERN | | ECR2 TOTALIZE PATTERN | | ---- | ECRn TOTALIZE PATTERN | | 30 |
|---|---|---|---|---|---|---|---|---|
| | CHECK PATTERN | CALCULATION PATTERN | CHECK PATTERN | CALCULATION PATTERN | | CHECK PATTERN | CALCULATION PATTERN | |

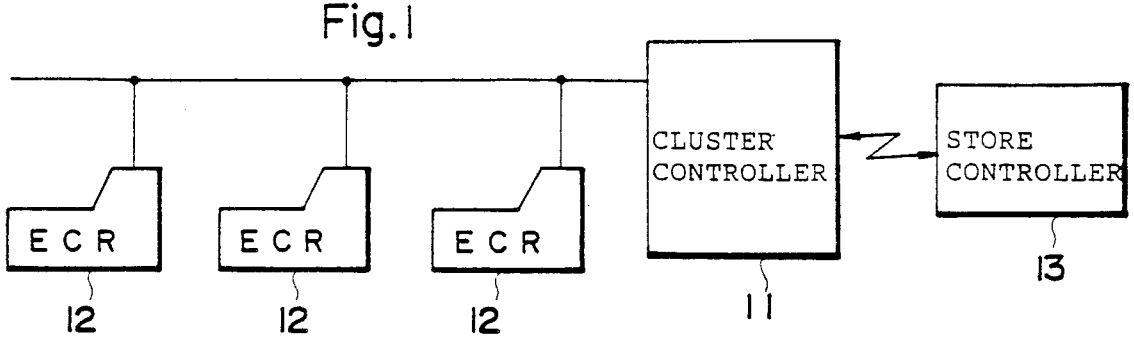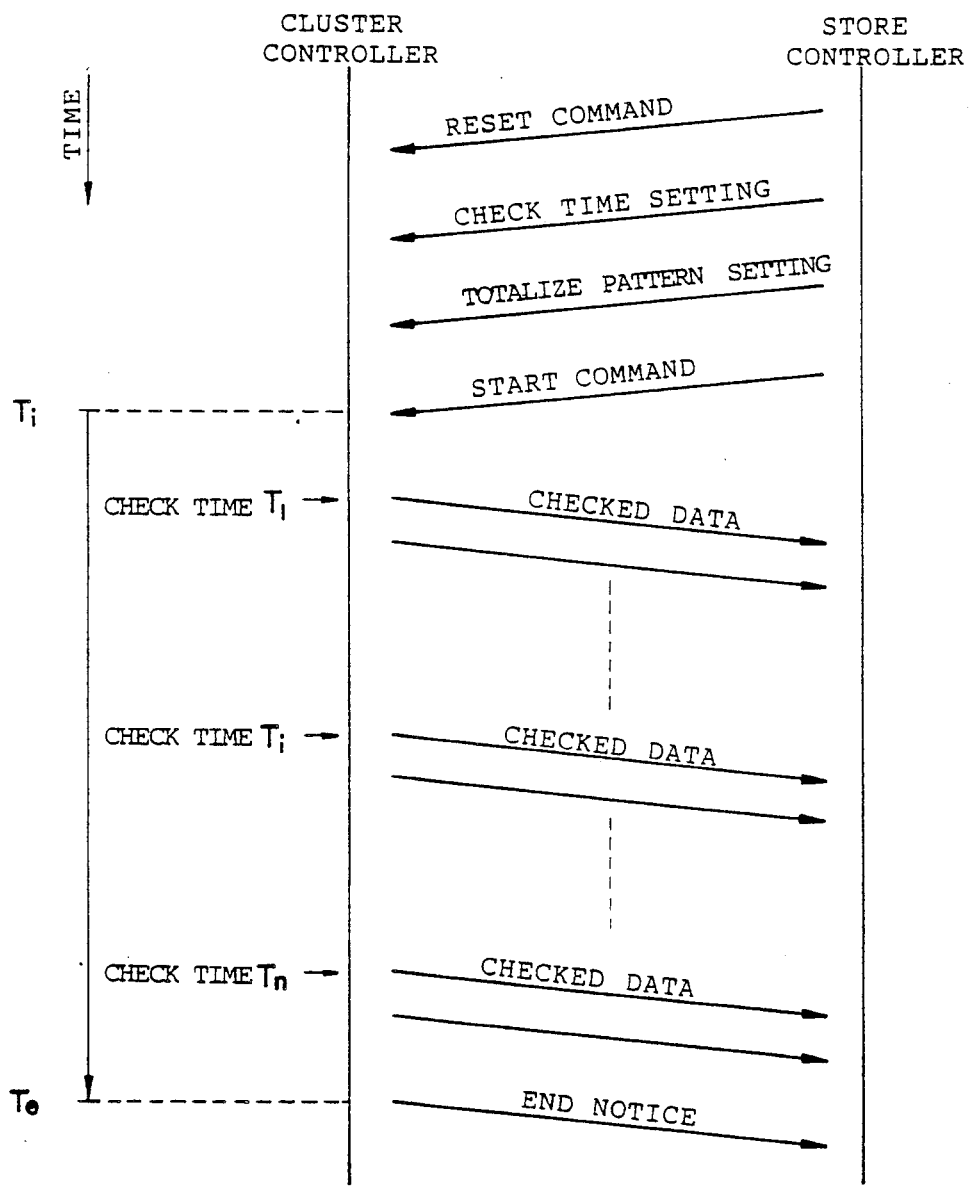

Fig.3a
RESET COMMAND MESSAGE
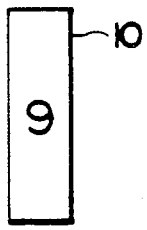
Fig.3b
CHECK TIME SETTING MESSAGE
| 2 | CHECK TIME T1 | CHECK TIME T2 | ------ | CHECK TIME Tn | END TIME |
|---|---|---|---|---|---|
20
Fig.3c
TOTALIZE-PATTERN SETTING MESSAGE
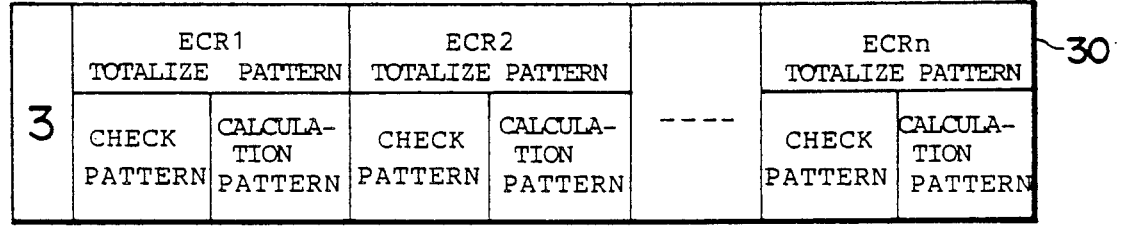
Fig.3d
START COMMAND MESSAGE

Fig. 4a

CHECKED DATA MESSAGE 50

| 1 | ECR NO. | X | TOTALIZED DATA |

Fig. 4b

CALCULATED DATA MESSAGE 60

| 2 | ECR NO. | X | TOTALIZED DATA |

Fig. 4c

END NOTICE MESSAGE

| 9 | 70

AT TOTALIZED DATA REQUEST

AT CALCULATION-END CHECK

AT CALCULATION RELEASE COMMAND

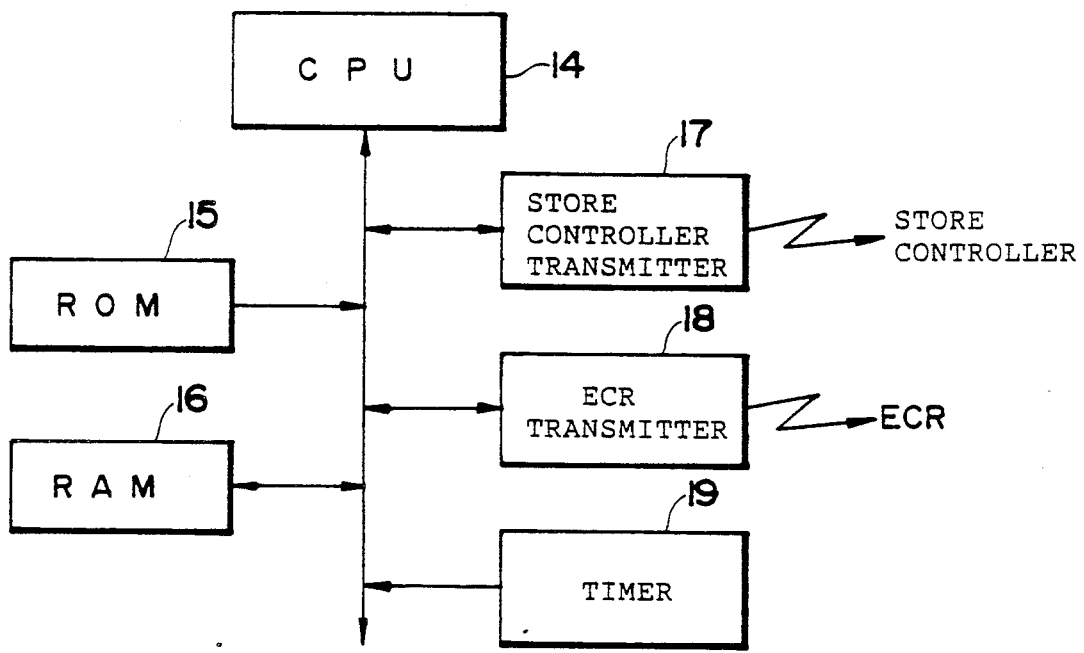

POS TERMINAL GROUP MANAGEMENT DEVICE WITH MEMORY FOR PRE-STORING DIFFERENT COLLECTION DATA RANGES FOR EACH POS TERMINAL

This application is a continuation. of application Ser. No. 07/119,101, filed Nov. 10, 1987 now abandoned.

BACKGROUND OF THE INVENTION

1. Field of the Invention

The present invention relates to a POS (point-of-sales) terminal group management device, and more specifically to a POS terminal group management device connected to both a plurality of POS terminal devices for registering data related to commodities (inclusive of services) and a sales management device for managing sales in stores.

2. Description of the Prior Art

As is well known, a number of POS terminal devices are equipped in a large store such as supermarket. These POS terminal devices are connected to a sales management device for managing sales via a POS terminal group management device. On the basis of setting messages from the sales management device, information indicative of an range of data to be collected in checking sales situation or in exactly calculating sales is determined. On the basis of the determined range, sales data of each POS terminal device are collected and transmitted to the sales management device. In the above description, when the current sales situation is checked, data stored in a memory unit of the POS terminal are kept stored, while after the sales are exactly calculated, data stored in a memory unit of the POS terminal are cleared.

In the prior-art management device, however, the range of data to be collected in sales check or sales calculation is determined uniformly, it has been impossible to change the range of data to be collected in each POS terminal device.

In a tenant building, or a shopping center, detailed sales information is required for the directly managed stores. However, rough sales information (e.g. sales amount and the number of customers) is sufficient for other stores. Further, there exists a case where detailed sales information is collected once a month, and therefore rough information is sufficient on an ordinary occasion. As described above, in the prior art management device, since the range of data (sales information) to be collected is determined, there exist problems in that much time is spent to collect unnecessary data or it takes much time for checking processing or exact calculation processing. In addition, since labor time of the operators of the POS terminal devices and the sales management device increases the collected data are usually late in coming back.

SUMMARY OF THE INVENTION ·

With these problems in mind, therefore, it is the primary object of the present invention to provide a POS terminal group management device which can collect necessary data from POS terminal devices and transmit collected data to a sale management device.

To achieve the above-mentioned object, a POS terminal group management device of the present invention is connected to both a plurality of POS terminal devices for registering data related to commodities and totalizing the registered data and a sales management device for managing sales, and comprises (a) storing means for previously storing totalization pattern information indicative of collection ranges of collected and totalized data for each POS terminal device; (b) commanding means for commanding the POS terminal device to transmit totalized data, and (c) control means for requesting transmission of necessary totalized data in accordance with totalization pattern information stored in said storing means in response to a command from said commanding means for each POS terminal device, and controlling transmission of the totalized data to said sales management device whenever the totalized data are transmitted from said POS terminal devices.

In the present invention, when transmission of totalized data is commanded, the POS terminal group management device requires necessary data transmission in accordance with totalization pattern information stored for each POS terminal device. When collected data are transmitted from the POS terminal device, the collected data are transmitted to the sales management device from the POS terminal group management device. Therefore, it is possible to eliminate unnecessary data transmission, to quickly obtain processed results of sales information, and to allow operators of the POS terminal devices and the sales management device to go home earlier.

BRIEF DESCRIPTION OF THE DRAWINGS

FIG. 1 is a block diagram showing a transaction processing system including a cluster controller of an embodiment of the present invention;

FIG. 2 is an illustration for assistance in explaining telegraphic message transmitted between the cluster controller and a store controller;

FIGS. 3a to 3d are illustrations for assistance in explaining telegraphic messages transmitted from the store controller to the cluster controller;

FIGS. 4a to 4c are illustrations for assistance in explaining telegraphic messages transmitted from the cluster controlled to the store controller;

FIG. 6 is a schematic block diagram showing an electrical construction of the cluster controller shown in FIG. 1;

FIG. 7 is an illustration showing a check time table stored in a RAM shown in FIG. 6;

FIG. 8 is an illustration showing a totalization pattern table stored in the RAM shown in FIG. 6.

DETAILED DESCRIPTION OF THE PREFERRED EMBODIMENTS

Figure 5A:
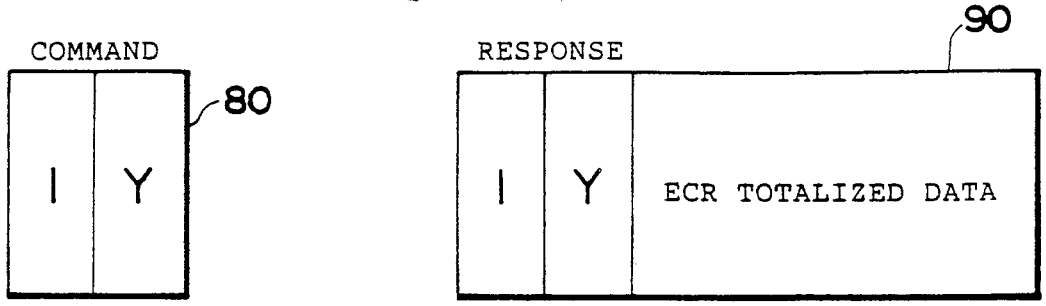
FIGS. 5a to 5c are illustrations for assistance in explaining telegraphic messages transmitted between an ECR and the cluster controller.

FIG. 1 shows a transaction processing system including an embodiment of the POS terminal group management device (referred to as a cluster controller, hereinafter) of the present invention. In FIG. 1, a plurality of electronic cash registers (referred to as ECRs) 12 corresponding to the POS terminal devices and a store controller 13 corresponding to the sales management device are connected to this cluster controller 11. The ECR 12 registers data related to commodities (e.g. a sum of money, the number of commodities, etc.) for commodity sales registration processing. The store controller 13 implements sales management.

FIG. 2 shows flows of telegraphic messages transmitted every day between the cluster controller and the store controller. FIGS. 3a to 3d show messages transmitted from the store controller to the cluster controller, on which FIG. 3a shows a reset command message; FIG. 3b shows a check time setting message; FIG. 3c shows a totalization pattern setting message; and FIG. 3d shows a start command message. FIGS. 4a to 4c show messages transmitted from the cluster controller to the store controller, in which FIG. 4a shows a checked data message; FIG. 4b shows an exact calculated data message; and FIG. 4c shows an end notice message. The totalization includes check and calculation. The check processing is a totalization processing with regard to the registered data in the memory of the ECR in which the registered data in the memory of the ECR are kept stored, whereas the calculation processing is the totalization processing in which the registered data in the memory of the ECR are cleared. With reference to FIGS. 2 to 4, the meanings of messages transmitted between the cluster controller and the store controller will be described hereinbelow.

At a business start time in stores, a reset command message 10, a check time setting message 20; a totalization pattern setting message 30 and a start command message 40 are transmitted from the store controller 13 to the cluster controller 11. The reset command message 10 commands the cluster controller 11 to be reset. The check time setting message 20 is a message for determining a check time and an end time at each ECR 12 connected to the cluster controller 11. The totalization pattern setting message 30 is a message for determining a range of totalized data collection for each ECR 12. Here, if a code indicative of check pattern or exact calculation pattern is "1", only the terminal reports are collected. If "2", the terminal reports and reports for each person in charge (referred to as person-in-charge reports) are collected. If "3", the terminal reports, the person-in-charge reports, and reports for each section (group of commodities) (referred to as section reports) are collected. If "4", the terminal reports, the person-in-charge reports, the section reports, and reports for each PLU (price look-up) (referred to as PLU reports) are collected. The start command message 40 is a message to start the transmission of checked data or calculated data.

In business time and at predetermined check times, the cluster controller 11 transmits the checked data message 50 transmitted from the ECR 12 to the store controller 13. Here, the checked data message 50 is composed of a code indicative of the kind of message (e.g. "1"), a number data indicative of an ECR from which the message is transmitted, and a code "X" indicative of the kind of totalized data. If "X" is 1, this indicates a terminal report, if 2, this indicates a person-in-charge report; if 3, this indicates a section report, if 4, this indicates a PLU report.

Further, the cluster controller 11 transmits a calculated data message 60 transmitted from any ECR 12 to the store controller 13 from the time Ti when the start command message 40 is received to the end time Te when the business ends. Here, the calculation data message 60 is composed of a code (e.g. "2") indicative of the kind of message, a number indicative of an ECR from which the message is transmitted, a code "X" indicative of the kind of totalized data, and a totalized data. The codes indicative of the kind of totalized data are the same as in the checked on a message. Further, the cluster controller 11 transmits an end notice message 70 to the store controller 13 at end time Te.

Figure 5B:
Figure 5C:
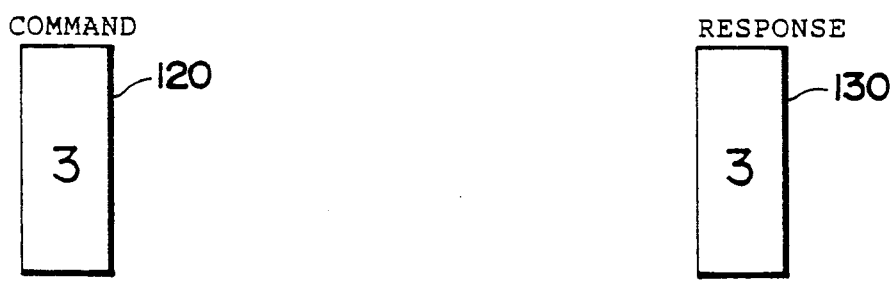

FIGS. 5a to 5c show messages transmitted between the ECRs and the cluster controller, in which FIG. 5a shows a message transmitted when a totalized data is requested; FIG. 5b shows a message transmitted to check whether an exact calculation is completed or ended; and FIG. 5c shows a message transmitted to instruct to release an exact calculation.

At check times or at the determination of exact calculation end, the cluster controller 11 requests totalized data to ECR 12. At this moment, a code "Y" indicative of the kind of totalized data is included in the command 80 given from the cluster controller 11 to the ECR 12 and a response 90 returned from the ECR 12 to the cluster controller 11 in response to the command 80. If "Y" is "1", this indicates a terminal report; if "2", this indicates a person-in-charge report; if "3", this indicates a section report; if "4", this indicates a PLU report.

Further, the cluster controller 11 checks whether ECR has already implemented exact calculation. At this moment, when a command 100 is given from the cluster controller 11 to the ECR 10, ECR 12 returns a response 110 to the cluster controller 11. This response 110 includes a code "Z" which discriminates whether exact calculation is completed or not. If "Z" is "0", this indicates that exact calculation is not yet completed; if "1", this indicates that exact calculation has been completed.

Further, to release exact calculation, the cluster controller 11 gives a command 120 to the ECR 12. In response to this command, the ECR 12 clears all registered data and totalized data in the memory for exact calculation release, outputting a response 130 to the cluster controller 11.

FIG. 6 is a schematic block diagram of an electrical construction of the cluster controller shown in FIG. 1. In FIG. 6, the cluster controller 11 is provided with a CPU 14, to which a ROM 15, a RAM 16, a store controller transmitter section 17, an ECR transmitter section 18, and a timer circuit 19 In the ROM 15 an operation program for the CPU 14 based upon a flowchart shown in FIGS. 9a and 9b (described later) is stored. In the RAM 16, a check time table as shown in FIG. 7 and a totalization pattern table as shown in FIG. 8 (both described later) are stored. The store controller transmitter section 17 intermediates data transmission between the CPU 14 and the store controller 13, and the ECR transmitter section 18 intermediates data transmission between the CPU 14 and the ECR 12. The timer circuit 19 indicates the current time.

FIG. 7 shows a check time table stored in the RAM 16 shown in FIG. 6, and FIG. 8 shows a totalization pattern table stored in the RAM 16 shown in FIG. 6. In FIG. 7, the contents of the check time setting message 20 shown in FIG. 3b are stored in this check time table. In FIG. 8, the contents of the totalization pattern setting message 30 shown in FIG. 3c are stored in this totalization pattern table.

Figure 9A:
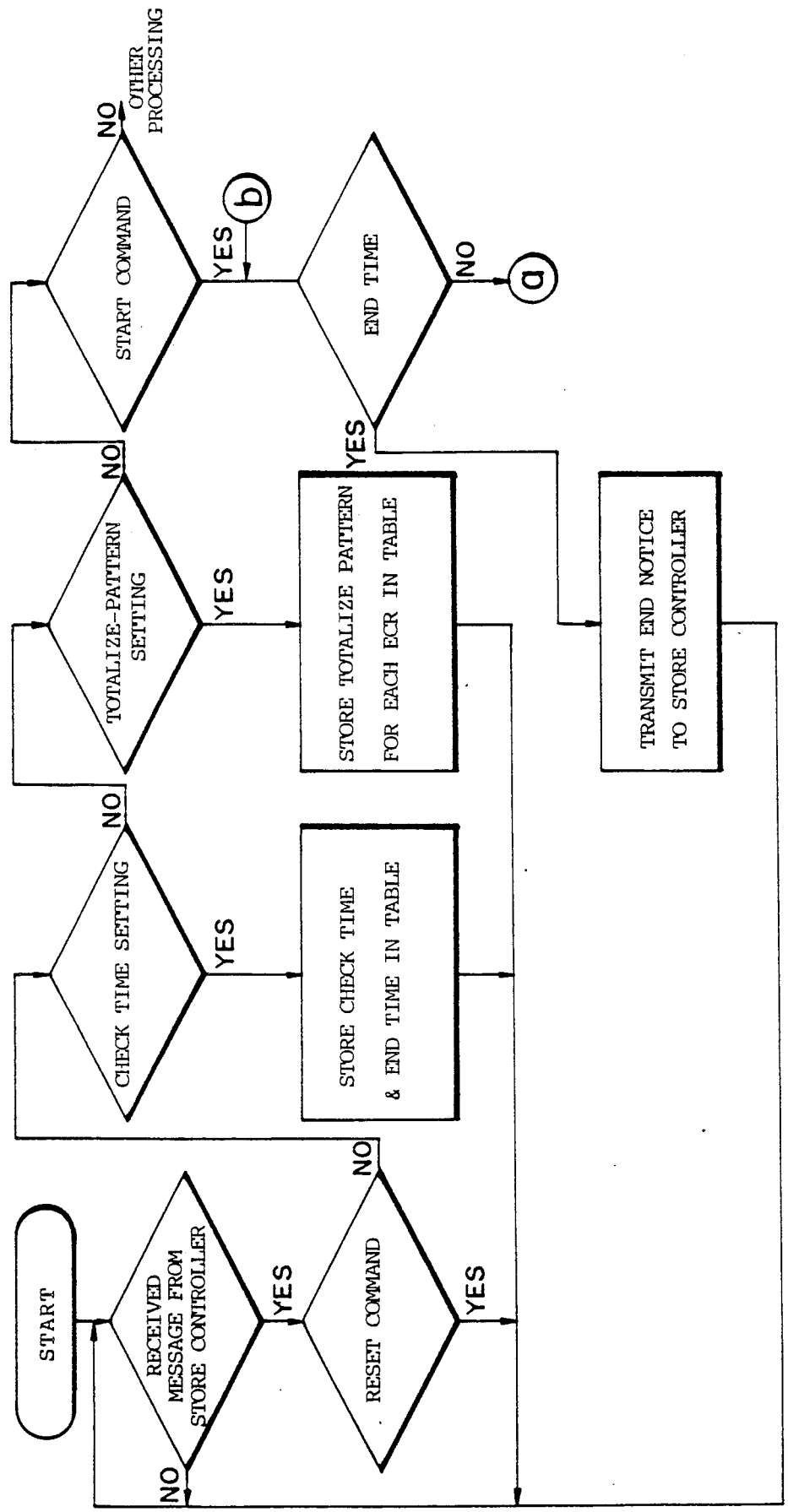
FIGS. 9a and 9b are flowcharts for explaining the operation of an embodiment of the present invention.
Figure 9B:
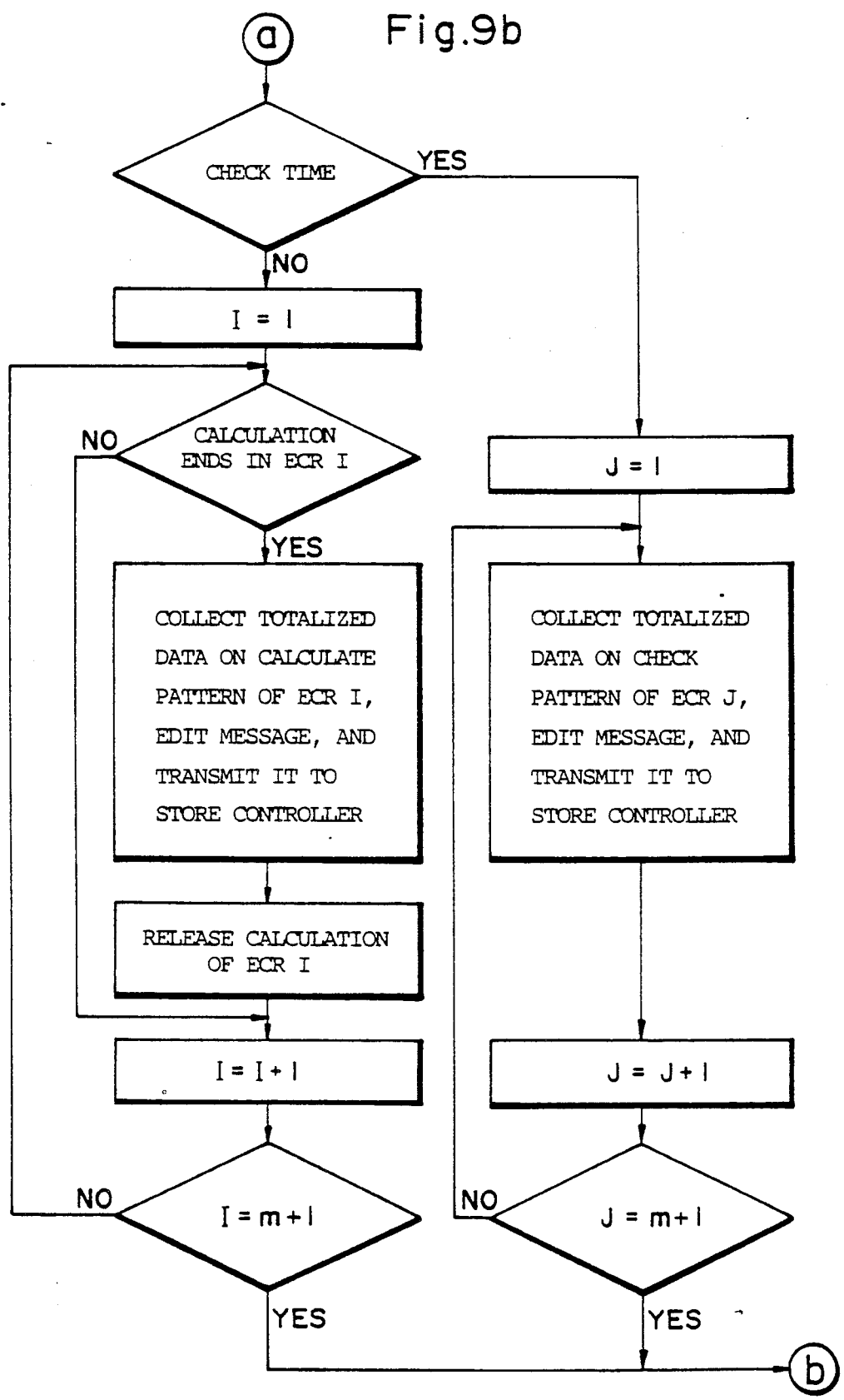

FIGS. 9a and 9b are flowcharts for assistance in explaining the operation of an embodiment of the present invention. With reference to FIGS. 1 to 9b, the operation of the embodiment will be described in detail hereinbelow.

In the cluster controller 11, the CPU 14 discriminates whether the store controller 13 transmits a message. If a message from the store controller 13 is received, the CPU 14 discriminates whether the received message is a reset command message 10. When this reset command is received, the cluster controller 11 stops transmitting a totalized data to the store controller 13.

On the other hand, if the message is not the reset command message 10, the CPU 14 discriminates whether the message is a check time setting message 20 or not. If a check time setting message 20, the CPU 14 stores a check time data and an end time data included in the message in the check time table shown in FIG. 7.

On the other hand, if not the check time setting message 20, the CPU discriminates whether the message is the totalization pattern setting message 30 or not. If a totalization pattern setting message 30, a totalization pattern of each ECR is stored in the totalization pattern table shown in FIG. 8.

On the other hand, if not the totalization pattern setting message 30, the CPU 14 discriminates whether the message is a start command message 40 or not. If a start command message 40, the CPU discriminates whether the current time is an end time on the basis of an end time data stored in the check time table and the current time data given from the timer circuit 19. If the current time is an end time, an end notice message 70 is transmitted to the store controller 13, returning to the initial conditions.

On the other hand, if not the end time, the CPU discriminates whether the current time is a check time or not. If any one of check times Tl to Tn, a command 80 is applied to al the ECRs 12 connected to the cluster controller 11. For instance, when the check pattern of the ECR 12 includes a terminal report and a person-in-charge report, since Y is 1 and 2, a command "11" indicative of terminal report transmission and a command "12" indicative of person-in-charge report transmission are transmitted. Therefore, a response 90 including a terminal report and a response 90 including a person-in-charge report are transmitted from the ECR 12 to the cluster controller 11. When the cluster controller 11 receives a response 90 including a totalized data from the ECR 12, a checked data message 50 is edited and then transmitted to the store controller 13. The above operation is effected to all the ECR 12.

On the other hand, if not the check time, the CPU checks for each ECR 12 whether exact calculation has been completed or not; that is, the cluster controller 11 gives a command 100 to each ECR 2. And, when a response 110 including a code indicative of exact calculation completion is given from the ECR 12, a command 80 indicative of totalized data in given. When a response 90 is given from the ECR 12, an exact calculation data message 60 is edited and transmitted to the store controller 13. Therefore, a command 120 is given to the ECR 12 to release the exact calculation of the ECR, so that a response 130 is returned from the ECR 12. The above-mentioned operation is made for all the ECRs 12 in which exact calculation has been completed. After the checking operation and the exact calculating operation have been implemented for all the ECRs, control returns to a routine for discriminating whether the current time reaches an end time.

As described above, since only necessary data are collected in accordance with check pattern or exact calculation pattern previously determined for each ECR and then transmitted to the store controller, the processing efficiency can be improved.

As described above, in the POS terminal group management device of the present invention, since the transmission of necessary totalized data is requested in accordance with totalization pattern information stored for each POS terminal device whenever the transmission of totalized data is commanded and further the totalized data are transmitted to the sales management device when the totalized data are transmitted from the POS terminal device, it is possible to eliminate the transmission of useless data and therefore to quickly obtain sales information processing results, thus allowing operators of the POS terminal devices and the sales management device to go home earlier without working extra hours or overtime.

What is claimed is:

1. A point-of-sales terminal group management device connectable to: (1) a plurality of point-of-sales terminal devices, each for registering data related to commodities and for totalizing the registering data and (b 2) a sales management device for managing sales, said group management device comprising:
   (a) storing means for previously storing, for each of said point-of-sales terminal devices, respective totalization pattern codes indicative of: (i) different types of data categories to be collected; and (ii) collection ranges in which data is to be collected to form totalized data for the data categories;
   (b) commanding means for commanding each point-of-sales terminal device to transmit totalized data in accordance with its respective totalization pattern code stored in said storing means; and
   (c) transmitting means for transmitting to said sales management device totalized data which has been formed in the point-of-sales terminal device in accordance with the totalization pattern code commanded by said commanding means whenever the totalized data are transmitted from said point-of-sales terminal device.

2. The point-of-sales terminal group management device as set forth in claim 1, which further comprises timer means for measuring current time, and wherein said commanding means commands each point-of-sales terminal device to transmit totalized data whenever said timer means measures a predetermined time.

3. The point-of-sales terminal group management device as set forth in claim 1, wherein said commanding means commands a point-of-sales terminal device which has completed an exact calculation processing to transmit totalized data whenever the exact calculation processing has been completed.

4. The point-of-sales terminal group management device as set forth in claim 1, wherein said data categories include terminal report data, person-in-charge report data, commodity section report data and PLU report data.

5. A point-of-sales terminal group management system comprising:
   (a) a plurality of point-of-sales terminal devices, each for registering data related to commodities and for totalizing the registered data;
   (b) a sales management device for managing sales;
   (c) a group management device connected to said plurality of point-of-sales devices and to said sales management device, said group management device comprising:
      (1) storing means for previously storing, for each of said point-of-sales terminal devices a respective totalization pattern code, received from said sales management device, and indicative of collection ranges in which data is to be collected to form totalized data;

(2) commanding means for commanding each point-of-sales terminal device to transmit totalized data in accordance with its respective totalization pattern code stored in said storing means; and (3) transmitting means for transmitting to said management device totalized data which has been formed in the point-of-sales terminal device in accordance with the totalization pattern code commanded by said commanding means whenever the totalized data are transmitted from said point-of-sales terminal device; and (d) said sales management device including totalization pattern setting means for transmitting a totalization pattern setting message to said group management device, said message including said totalization pattern codes which respectively correspond to said point-ofsales terminal devices, said group management device storing said totalization pattern codes in said storing means.

6. A point-of-sales terminal group management device connectable to: (1) a plurality of point of sales terminal devices, each for registering data related to commodities and for totalizing the registered data, and (2) a sales management device for managing sales, said group management device comprising:

(a) storing means for previously storing, for each of said point of sales terminal devices, a respective totalization pattern code indicative of collection ranges in which data is to be collected to form totalized data;

(b) commanding means for commanding each point-of-sales terminal deice to transmit totalized data in accordance with its respective totalization pattern code stored in said storing means, said commanding means commanding a point-of-sales terminal device which has completed an exact calculation processing to transmit totalized data to said group management device when it has completed the exact calculation processing;

(c) transmitting means for transmitting to said sales management device totalized data which has been formed in point-of-sales terminal device in accordance with the totalization pattern code commanded by said commanding means whenever the totalized data are transmitted from said point-of-sales terminal device; and (d) timer means for measuring current time, said commanding means commanding each point-of-sales terminal device to transmit totalized data whenever said timer means measures a predetermined time.

7. A point-of-sales terminal group management device, connectable to: (1) a plurality of point of sales terminal devices, each for registering data related to commodities and for totalizing the registered data, and (2) a sales management device for managing sales, said group management device comprising:

(a) storing means for previously storing, for each of said point-of-sales terminal devices, respective totalization pattern codes indicative of collection ranges in which data is to be collected to form totalized data for each point-of-sales terminal device;

(b) commanding means for commanding each point-of-sales terminal deice to transmit totalized data in accordance with its respective totalization pattern code stored in said storing means; and (c) transmitting means for transmitting to said sales management device totalized data which has been formed in the point-of-sales terminal device in accordance with the totalization pattern code commanded by said commanding means whenever the totalized data are transmitted from said point-of-sales terminal device.

8. A point-of-sales terminal group management system comprising:

(a) a plurality of point-of-sales terminal devices, each for registering data related to commodities and for totalizing the registered data;

(b) a sales management device for managing sales;

(c) a group management device connected to said plurality of point-of-sales devices and to said sales management deice, said group management device comprising:

(1) storing means for previously storing, for each of said point-of-sales terminal deices, a respective totalization pattern code, received from said sales management device, and indicative of collection ranges in which data is to be collected to form totalized data;

(2) commanding means for commanding each point-of-sales terminal device to transmit totalized data in accordance with its respective totalization pattern code stored in said storing means; and (3) transmitting means for transmitting to said sales management device totalized data which has been formed in the point-of-sales terminal device in accordance with the totalization pattern code commanded by said commanding means whenever the totalized data are transmitted from said point-of-sales terminal device.

9. The point-of-sales terminal group management system as set forth in claim 8, wherein said sales management device includes totalization pattern setting means for transmitting a totalization pattern setting message to said group management device, said message including totalization pattern codes which respectively correspond to said point-of-sales terminal devices, said group management device storing said totalization pattern codes in said storing means.

10. The point-of-sales terminal group management system as set forth in claim 8, wherein said each point-of-sales terminal device includes means for totalizing the registered data in accordance with the totalization pattern code commanded by said commanding means of said group management device.

* * * * *

UNITED STATES PATENT AND TRADEMARK OFFICE
CERTIFICATE OF CORRECTION

PATENT NO. : 5,119,294
DATED : June 2, 1992
INVENTOR(S) : TOSHIFUMI TANAKA

It is certified that error appears in the above-identified patent and that said Letters Patent is hereby corrected as shown below:

ON THE COVER PAGE

Please insert the following:

--[63] Related U.S. Application Data

Continuation of Serial. No. 119,101, November 10, 1987--.

Signed and Sealed this

Twenty-eighth Day of September, 1993

Attest:

BRUCE LEHMAN

*Attesting Officer*   *Commissioner of Patents and Trademarks*